(12) United States Patent
Penman et al.

(10) Patent No.: US 7,076,852 B2
(45) Date of Patent: Jul. 18, 2006

(54) CONDUCTOR TORQUING SYSTEM

(75) Inventors: Andrew Robert Penman, Lowestoft (GB); Peter John Lovegrove, Lowestoft (GB)

(73) Assignee: BJ Services Company, Houston, TX (US)

( * ) Notice: Subject to any disclaimer, the term of this patent is extended or adjusted under 35 U.S.C. 154(b) by 155 days.

(21) Appl. No.: 10/367,210

(22) Filed: Feb. 14, 2003

(65) Prior Publication Data

US 2003/0172514 A1 Sep. 18, 2003

(30) Foreign Application Priority Data

Mar. 18, 2002 (GB) ............................................. 0206348

(51) Int. Cl.
*B23P 19/00* (2006.01)

(52) U.S. Cl. ........................... 29/426.5; 29/456; 29/235; 29/240; 81/57.16; 81/57.22; 81/57.34; 285/38; 285/39

(58) Field of Classification Search .................... 29/428, 29/429, 426.5, 450, 235, 240, 282, 559, 38 A, 29/33 T, 407.02, 888.09; 81/57.16, 57.22, 81/57.24, 57.36, 467, 576.16; 285/38, 39
See application file for complete search history.

(56) References Cited

U.S. PATENT DOCUMENTS

| 3,799,009 | A | | 3/1974 | Guier | |
| 4,023,449 | A | | 5/1977 | Boyadjieff | 81/57.16 |
| 4,092,881 | A | * | 6/1978 | Jurgens et al. | 81/57.34 |
| 4,603,464 | A | | 8/1986 | Smith, Jr. et al. | |
| 4,694,712 | A | | 9/1987 | Doss | |
| 4,895,056 | A | | 1/1990 | Schulze-Beckinghausen | |
| 5,060,542 | A | | 10/1991 | Hauk | 81/57.34 |
| 5,150,638 | A | | 9/1992 | Penisson | 81/57.17 |
| 5,386,746 | A | * | 2/1995 | Hauk | 81/57.34 |
| 5,727,778 | A | * | 3/1998 | Nodar | 269/43 |
| 5,740,702 | A | * | 4/1998 | Smith | 81/57.33 |
| 6,334,376 | B1 | * | 1/2002 | Torres | 81/372 |
| 6,550,128 | B1 | * | 4/2003 | Lorenz | 29/464 |
| 2004/0013515 | A1 | | 1/2004 | Penman et al. | |

FOREIGN PATENT DOCUMENTS

| EP | 0339005 B1 | 3/1993 |
| GB | 2160807 | 1/1986 |
| GB | 2230988 | 11/1990 |
| GB | 2344781 | 6/2000 |
| NL | 1022939 | 3/2003 |
| WO | WO 01/51763 A1 | 7/2001 |
| WO | WO 01/81047 A1 | 11/2001 |

OTHER PUBLICATIONS

International Search Report dated Feb. 24, 2005.

(Continued)

*Primary Examiner*—David P. Bryant
*Assistant Examiner*—Stephen Kenny
(74) *Attorney, Agent, or Firm*—Howrey LLP

(57) ABSTRACT

A conductor torquing system is provided for large diameter threaded conductor casing which comprises a lower chain vise adapted to grip a first joint of conductor casing, a plurality of movable arms operable to apply a retaining force to a second joint of conductor casing to maintain the latter in rotational contact with a spinning means. The spinning means is operable to rotationally make-up the second joint of conductor casing to the first joint of conductor casing to an initial make-up torque value. The apparatus also includes an upper chain vise for gripping the second joint of conductor casing and applying a final make-up torque to the threaded connection. The apparatus will allow a conductor connection to be made-up in a safe and efficient manner and generally assist in reaching the final torque stage more rapidly.

47 Claims, 6 Drawing Sheets

OTHER PUBLICATIONS

International Search Report dated Mar. 9, 2004.
Photograph of chain tong.
Photograph of spinning conductor pipe with rope.
Photograph of dual chain vises for breaking out horizontal conductor pipe.

International Search Report dated Jul. 29, 2003.

British Search Report dated Apr. 27, 2005.

International Search Report dated Mar. 8, 2004.

* cited by examiner

CONDUCTOR TORQUING SYSTEM

The present application claims the benefit of British Application No. GB 0206348.5, filed Mar. 18, 2002.

FIELD OF THE INVENTION

This invention relates to drilling equipment useful in the oil and gas industry. In particular, a system and method for making up or breaking out large diameter conductor casing or piles with threaded connectors in a vertical or horizontal mode are disclosed.

BACKGROUND OF THE INVENTION

Large diameter threaded conductor casings and piles are commonly used in drilling wells in the oil and gas industry, particularly for offshore wells. Typical conductor casing sizes used in the oil and gas industry range from 16 inches to 48 inches in diameter. Large diameter threaded tubulars are also used as pilings to secure offshore structures to the seafloor. These pilings may range from 16 inches to 48 inches and larger in diameter. These tubulars typically come in joints that are 30 to 40 feet in length with a threaded pin member on one end and a threaded box member on the other end.

Make-up of such large diameter threaded conductor casings typically requires rotating an upper joint so that its threaded pin member can screw into and make-up with the threaded box member of a stationary joint located in the rotary table. Currently, most conductor make-up service companies use rope to rotate or spin the upper joint of casing to partially make-up the connection. Two manual rig tongs are then connected to the two joints of conductor pipe, one above and one below the threaded connection, to torque the connection to the final make-up value. Other conductor make-up service companies may use a power tong to rotate or spin the upper joint of casing to make-up the connection. A separate manual tong is used on the bottom joint of casing to provide backup support to prevent the lower joint from rotating relative to the first joint of casing.

The current method of making up large diameter threaded connections is a hazardous process at best, involving several pieces of large, cumbersome equipment and several personnel working on the rig floor. There are safety hazards with the use of a rope for spinning pipe and in the handling and manipulation of both manual and powered tongs.

Thus, there is a need for a system and method of making up, or breaking out, large diameter threaded conductor casing which reduce the potential for injury to the operator and equipment and to create a more cost effective, efficient operation. The present invention is directed to a system and method which addresses this need for running large diameter threaded casings and/or piles. The invention also has application in the make-up or break-out of large diameter threaded tubulars in the horizontal mode, such as the laying of new pipeline.

SUMMARY OF THE INVENTION

In one embodiment of the invention, an apparatus for making up large diameter conductor casing having threaded connections is provided which comprises a lower chain vise adapted to grip a first joint of conductor casing to prevent rotation thereof, a plurality of moveable arms operable to apply a retaining force to a second joint of conductor casing to maintain a second joint of conductor casing in rotational contact with one or more drive wheels on a spinner means. The spinner means is operable to rotationally make-up a threaded connection for connecting the second joint of conductor casing to the first joint of conductor casing to an initial make-up torque. The apparatus also includes an upper chain vise adapted to grip the second joint of conductor casing and operable to apply a final make-up torque to the threaded connection connecting the second joint of conductor casing to the first joint of conductor casing. In one embodiment, the upper chain vise includes a pair of chains latchable together to grip the second joint of conductor casing, wherein the end of one of the chains is attached to a chain tensioner cylinder operable to tension the chains and the other end is attached to an anchor means. Similarly, the lower chain vise includes a pair of chains latchable together to grip the first joint of conductor casing wherein the end of one of the chains is attached to a chain tensioner cylinder that is operable to tension the chains and the other end is attached to an anchor means. A wrenching cylinder may connect the upper and lower chain vises wherein operation of the wrenching cylinder transmits the final makeup torque to the upper chain vise. The upper chain vise and lower chain vise may include one or more die blocks for gripping the conductor casing. A drive arm cylinder may be used to actuate the movable arms. Preferably, the chain tensioner, wrenching, and drive arm cylinders, as well as the drive unit for the drive wheels, are hydraulically actuated.

Another embodiment of the apparatus includes pivotable support arms for supporting the pair of chains for the upper chain vise, wherein the support arms are movable between a first position where the chains may be latched together and a second position where the chains may be released from the second joint of conductor casing. Similarly, the pair of chains for the lower chain vise may be supported by pivotable support arms, wherein the support arms are moveable between a first position where the chains may be latched together and a second position where the chains are released from the first joint of conductor casing. The apparatus may have one or more movable arms operable to apply a retaining force to the second joint of pipe to maintain the second joint of pipe in rotational contact with the drive wheels of the spinner means.

Another embodiment of the invention is directed to an apparatus for making up jointed pipe with threaded connections comprising a first chain vise adapted to grip a first joint of pipe to prevent rotation thereof, a spinner means having one or more drive wheels operable to rotationally make-up a threaded connection for connecting a second joint of pipe to the first joint of pipe to an initial make-up torque, and a second chain vise adapted to grip the second joint of pipe and operable to apply a final make-up torque to the threaded connection. The lower and upper chain vises may each include a pair of chains latchable together to grip the first and second joints of pipe respectively. Pivotable support arms for supporting the respective pair of chains may also be included wherein the support arms are movable between a first position where the chains may be latched together and a second position wherein the chains are released from the first joint and second joint of pipe, respectively.

According to another embodiment of the invention, a method for making up large diameter conductor casing having threaded connections is provided which includes the steps of gripping a first joint of conductor casing with a lower chain vise to prevent rotation thereof, applying a retaining force to a second joint of conductor casing with one or more arms to maintain the second joint of conductor casing in rotational contact with one or more drive wheels on a spinner means, making up a threaded connection connecting the second joint of conductor casing to the first joint of conductor casing to an initial make-up torque with the spinner means and applying a final make-up torque to the threaded connection connecting the second joint of conductor casing to the first joint of conductor casing with an upper chain vise.

According to another embodiment of the invention, a method for breaking out jointed pipe having threaded connections is disclosed. The method comprises the steps of gripping a first joint of pipe with a lower chain vise to prevent rotation thereof, applying a retaining force to a second joint of pipe with one or more arms to maintain the second joint of pipe in contact with one or more drive wheels on a spinner means, applying a breakout torque to the threaded connection connecting the second joint of pipe to the first joint of pipe with an upper chain vise, and breaking out the threaded connection with the spinner means until the second joint of pipe is disconnected from the first joint of pipe, wherein the lower chain vise, the upper chain vise, the one or more arms and the spinner means are components of a single apparatus.

BRIEF DESCRIPTION OF THE DRAWINGS

The following figures form part of the present specification and are included to further demonstrate certain aspects of the present invention. The invention may be better understood by reference to one or more of these figures in combination with the detailed description of the specific embodiments presented herein.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1:
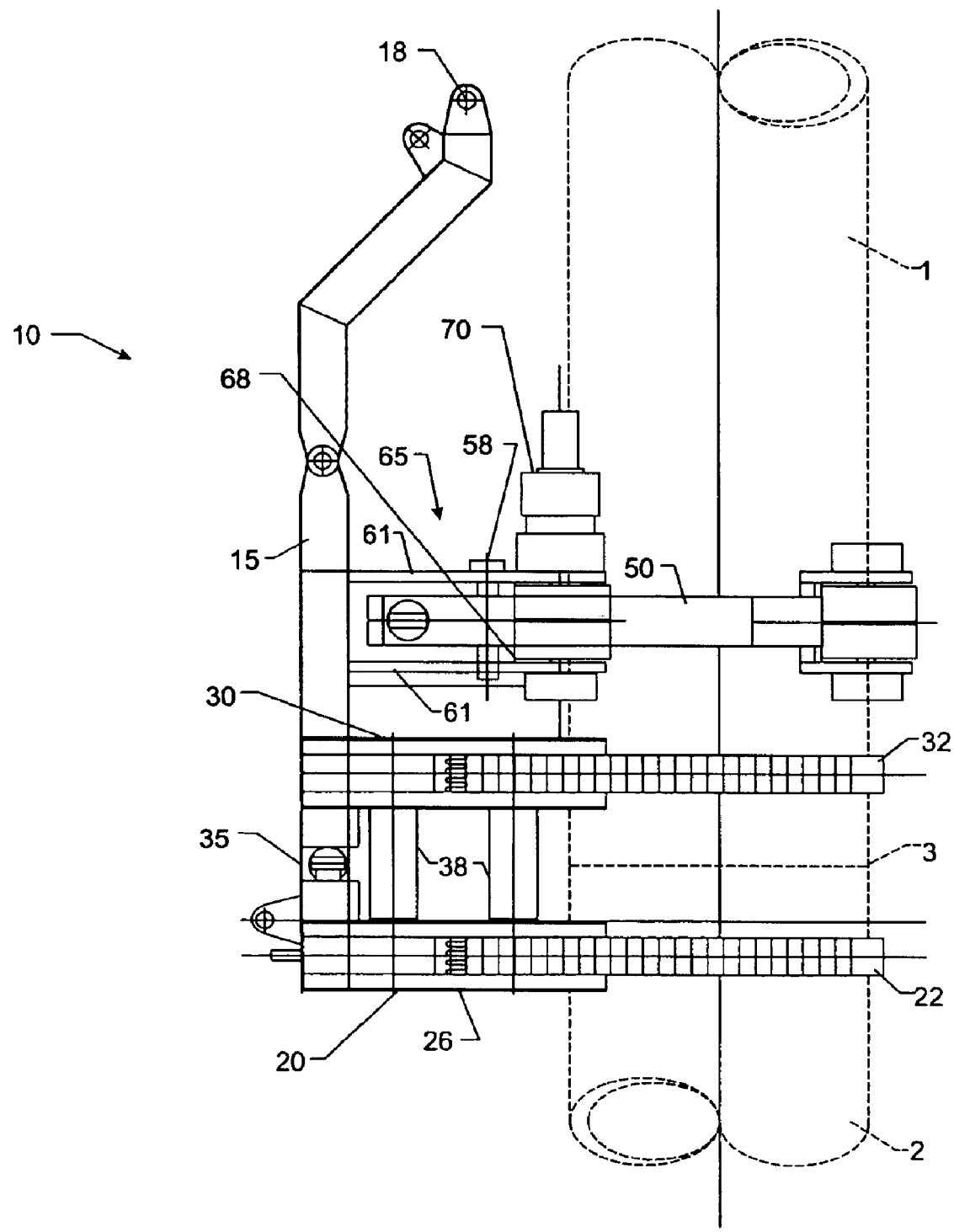
FIG. 1 is a side view of the conductor torquing apparatus according to one embodiment of the present invention.

Referring to FIG. 1, the conductor torquing apparatus of the present invention is shown making up a large diameter threaded conductor casing. More particularly, conductor torquing apparatus 10 is making up an upper conductor casing joint 1 to a lower conductor casing joint 2. The upper and lower joints of conductor casing are connected by a conventional large diameter threaded connection 3, typically including a threaded pin member (not shown) on the bottom of upper joint 1 which will stab into and make-up with a box member (not shown) on lower conductor casing joint 2 having mating threads. Traditional sizes for large diameter conductor pipe used in the offshore energy industry include 16", 18⅝", 20", 24", 26", 30", 36", 42" and 48" diameters. Although the present invention is particularly suited to make-up or break-out such traditional large diameter threaded conductor casings, one of skill in the art will appreciate that the invention could be modified to handle smaller diameter threaded tubulars as well.

The conductor torquing apparatus 10 includes a support frame 15 with eyelet 18 on its uppermost end. Apparatus 10 may be suspended from the derrick or from a commercially available automated mechanism for maneuvering power tongs to and from the well center line during casing running operations, such as BJ Tubular Services' Leadhand MKII. Cables and/or chains for suspending the conductor torquing apparatus from the derrick or automated mechanized system may be attached to eyelet 18.

Figure 2:
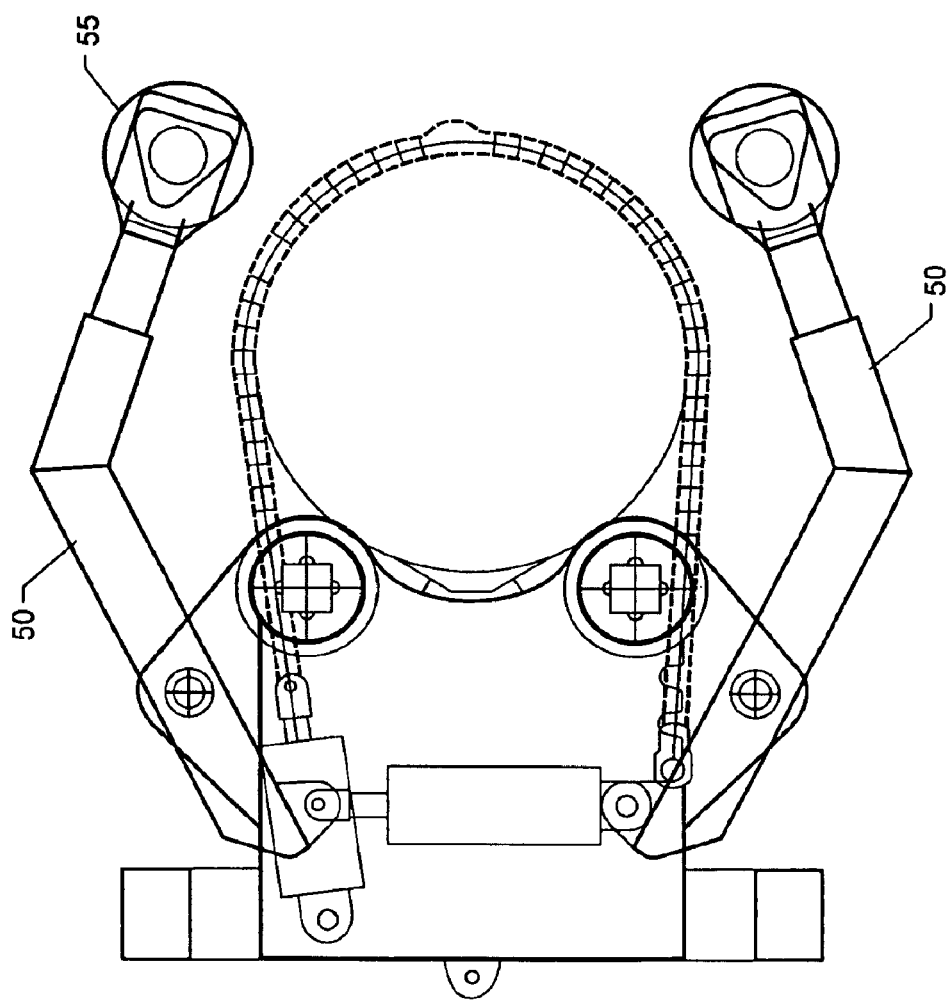
FIG. 2 is a sectional plan view showing the conductor torquing apparatus with the retaining arms in the open position.
Figure 4:
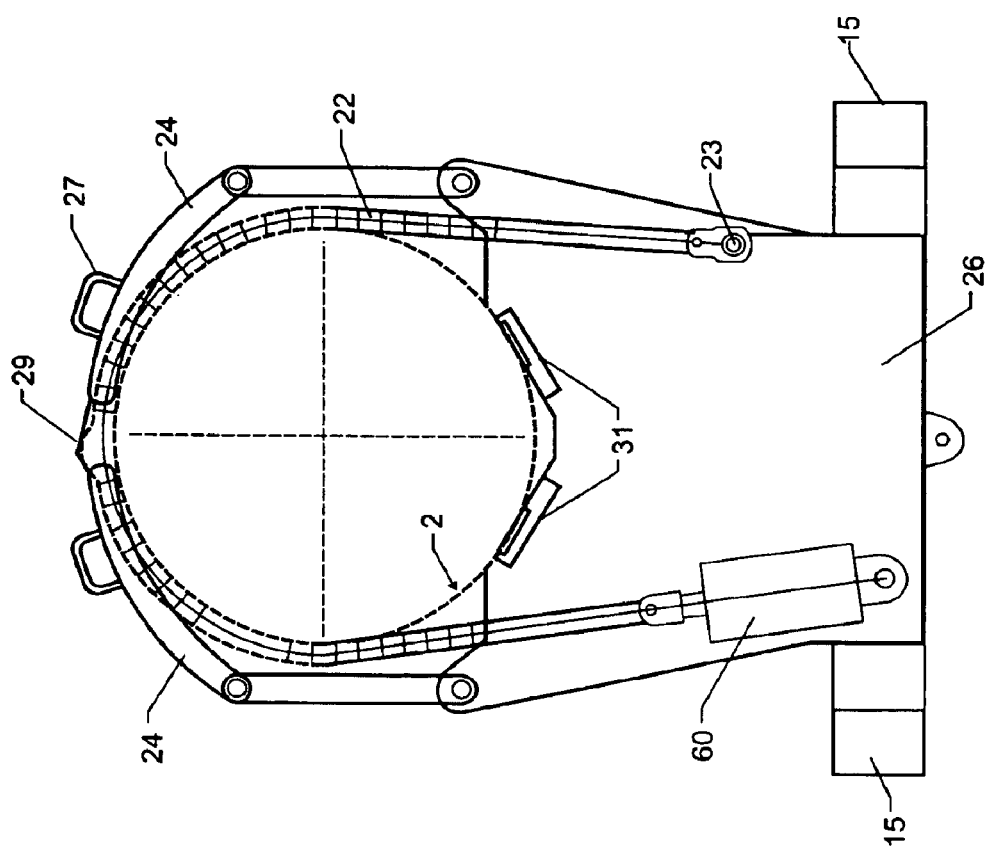
FIG. 4 is a sectional plan view illustrating a chain vise with support arms.
Figure 5:
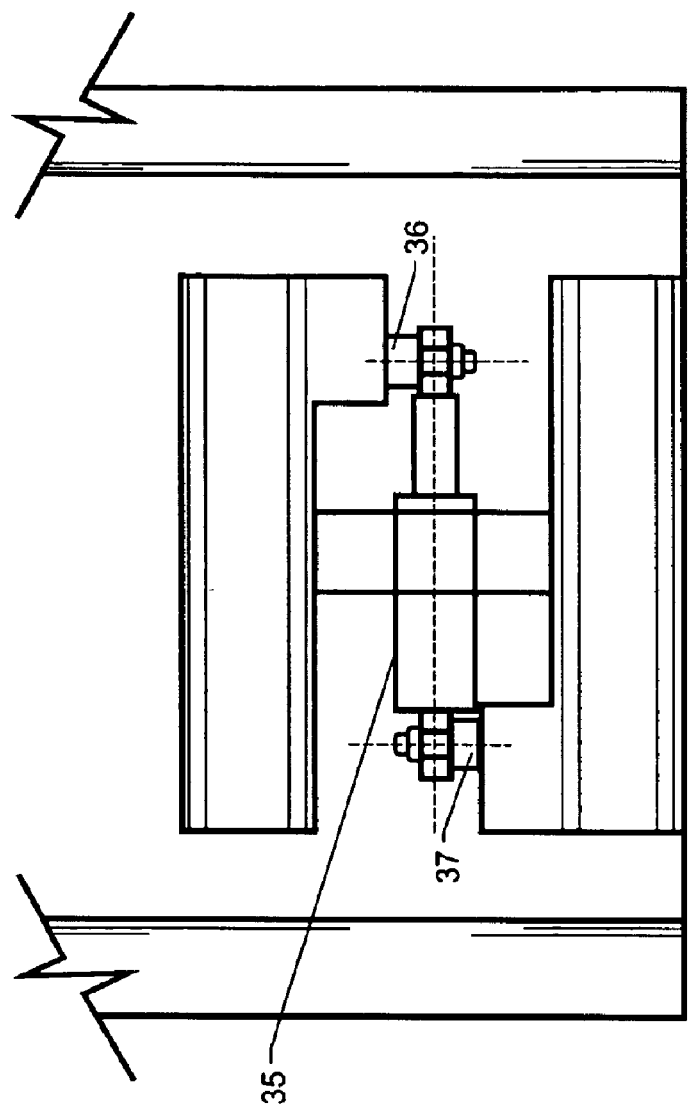
FIG. 5 is an end view of the upper and lower chain vises and wrenching cylinder.

Attached to the lower end of support frame 15 is lower chain vise 20 which is adapted to grip the upper portion of lower conductor casing 2 that extends from the rotary table. Lower chain vise 20 includes chain 22 which wraps around, and ultimately grips, the lower conductor casing. Chain 22 may consist of two separate lengths which have a latching device 29 to connect the two lengths of the chain about the conductor casing. Alternatively, a full wrap of chain may extend substantially around the conductor casing and attaches using any conventional latching device, such as a "cocks comb" or removable pin. Such latching devices are well known in the art. Lower chain vise 20 may also include chain tensioner cylinder 60 which is attached to one end of chain 22 as shown in FIGS. 2 and 4. The other end of chain 22 may be secured by any suitable anchor means such as pin 23. To facilitate handling of chain 22, chain vise 20 may include support arms 24, which may be pivotably attached to horizontal support member 26. Handles 27 may be used to open, connect and disconnect chain 22 about casing 2.

Chain tension cylinder 60, when actuated, will apply sufficient tension on chain 22 to prevent lower conductor casing 2 from rotating. Chain vise 20 may include one or more die blocks 31 for applying an additional gripping force on casing 2 when chain 22 is tensioned. Die blocks 31 are similar to conventional tong dies and include teeth for biting into the casing. Once chain 22 is fully tensioned, lower chain vise 20 serves as an anchor for apparatus 10. Lower chain vise 20 also provides backup support to prevent lower conductor casing 2 from rotating during the rotational make-up of upper conductor casing 1 to the lower conductor casing.

Upper chain vise 30 is spaced vertically above lower chain vise 20 as shown in FIG. 1. Upper chain vise 30 is adapted to grip the upper conductor casing 1 and is operable to apply a final make-up torque to the threaded connection 3 as described in more detail below. Upper chain vise 30 is similar in construction and operation to lower chain vise 20 with chain 32 being of sufficient length to extend around the upper conductor casing. Chain 32 attaches to a separate chain tensioner cylinder 60 on one end and to an anchor means, such as pin 23, on the other end. Chain tensioner cylinders 60 are preferably hydraulically actuated, although the apparatus could be actuated by electromechanical or pneumatic means. Chain 32 may be latched in a similar fashion as chain 22, such as by a latching device similar to latching device 29. Upper chain vise 30 may also include one or more die blocks, similar to die blocks 31, to further grip upper conductor casing 1 when final makeup is applied by the upper chain vise. The die blocks may be positioned about the horizontal support members (member 26 and a comparable member on the upper chain vise) to grip a range of pipe diameters. By way of example, the die blocks may be positioned to grip conductor casings ranging from 16" to 48".

Supports 38 provide additional vertical supports and spacing between upper chain vise 30 and lower chain vise 20. The supports 38 needs to be of sufficient length to ensure that upper chain vise 30 will grip the upper conductor casing joint after lower chain vise 20 has gripped the lower conductor casing joint. The threaded connectors may have upset box and pin members which have a greater outer diameter than the conductor casing itself. The upper and lower chain vises for conductor torquing apparatus 10 can easily accommodate the larger diameter box and pin members. Thus, it shall be understood that references to gripping the upper or lower conductor casing joints with the chain vise is meant to include the gripping of the box and/or pin members of the threaded connector as well.

A spinning means is attached to support frame 15 above the upper chain vise 30. Spinning means 65 may include one or more drive wheels 68, and a spinning section drive gear unit 70 for each drive wheel. In another preferred embodiment, spinning means 65 also includes retaining arms 50 and arm drive cylinder 65. Referring to FIG. 2, movable retaining arms 50 are shown in the open position about the upper conductor casing joint. Retaining arms 50 may be telescopic in nature to provide for greater extension and/or to accommodate a wider range of conductor casing sizes. Arms 50 may also include retaining rollers 55 attached to their distal ends. Retaining arms 50 are attached to horizontal support frame 61 by pivot pins 58. Horizontal support frame 60 extends from support frame 15 and may be part of spinning means 65. The proximal end of arms 50 is connected to drive cylinder 65 by any suitable connector such as pins 53. Drive cylinder 65 may be positioned between the upper and lower plates of horizontal support frame 61. Actuation of drive cylinder 65 will cause arms 50 to pivot about pivot pins 58, thereby opening or closing arms 50 about a joint of conductor casing. Drive cylinder 65 is illustrated in the extended position in FIG. 3, wherein arms 50 are closed about the upper conductor casing joint. Drive cylinder 65 is illustrated in the retracted position in FIG. 2 wherein arms 50 are moved to the open position.

Figure 3:
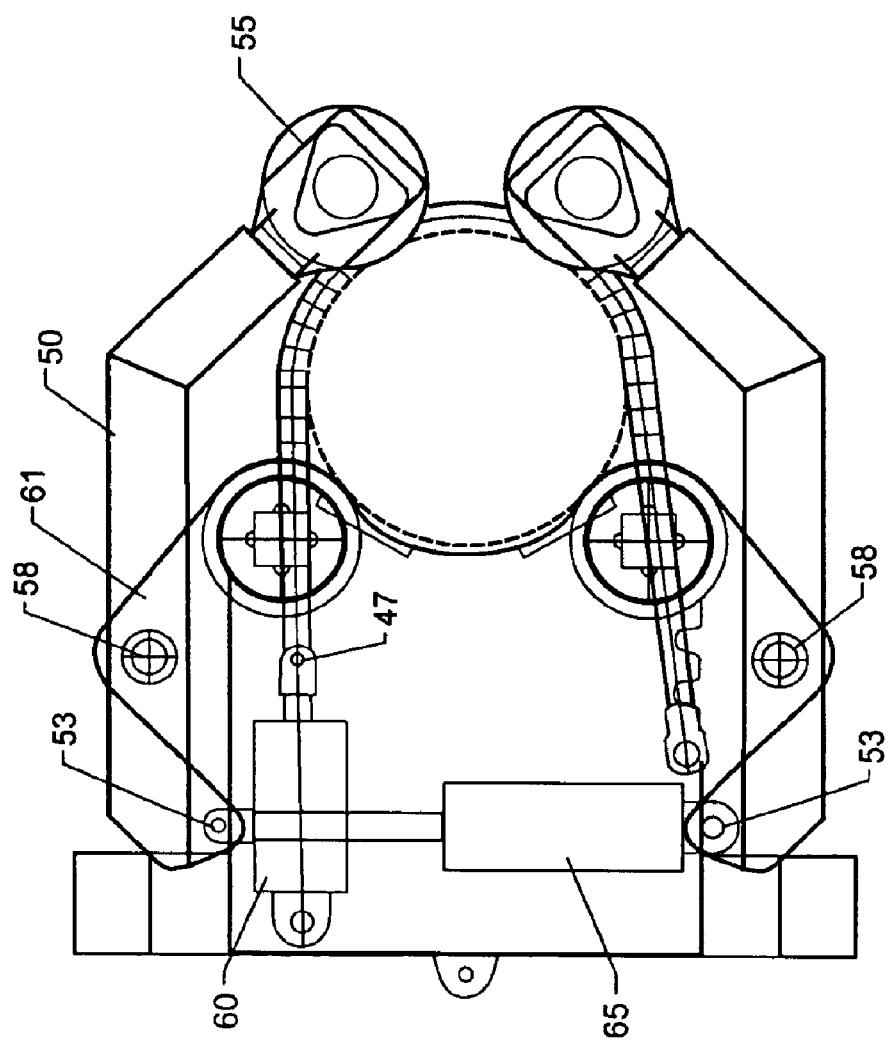
FIG. 3 is a sectional plan view showing the apparatus of FIG. 2 making up a smaller diameter conductor casing with the retaining arms in the closed position.

In the closed position, arms 50 apply a retaining force to the upper joint of conductor casing to maintain the joint in rotational contact with drive wheels 68. Although the embodiments shown in FIGS. 2 and 3 illustrate a pair of movable arms, one of skill will appreciate that a single arm could be used so long as it applies a retaining force to the upper joint of casing to maintain the joint in contact with drive wheels 68.

In one embodiment, drive wheels 68 have a polyurethane coating to maintain a friction contact with the upper conductor casing joint during the initial rotational make-up of the threaded connector 3. Alternatively, other suitable rubber materials may coat the drive wheels. The drive wheels are driven by hydraulic motor gear box 70 which may be attached to horizontal support frame 61. Retaining rollers 55 facilitate the rotation of upper conductor casing joint 1. In a preferred embodiment, the spinning means includes two drive wheels that are fixed in place but are capable of maintaining frictional contact with a wide variety of different size conductor pipe. In a preferred embodiment, the conductor torquing apparatus may make-up or break-out conductor pipe ranging from 16 inches up to 48 inches. As shown in FIGS. 2 and 3, horizontal support frame 61 may have a V-shape to facilitate the handling of different size conductor casings. The spinner means is used to rotate the upper joint of conductor pipe up to an initial make-up torque value, for example, up to about 5000 foot pounds. The initial make-up torque may range from stab-in to either shoulder engagement or achievement of taper thread interference, depending upon the size, type and make of the threaded connector. In the initial make-up position, threaded connector 3 will typically be within 15 degrees from a final make-up position.

Once the spinner means has applied the initial make-up torque to the connection, the upper chain vise 30 is used to apply the final make-up torque to the connection. Chain 32 is tightened around the upper conductor casing joint by activating the chain tensioner cylinder 60 for the upper chain vise. Once the upper chain vise has gripped the upper conductor joint, wrenching cylinder 35 is actuated to apply the final make-up torque to the connection. Wrenching cylinder 35 extends horizontally between the upper and lower chain vises. A vertical boss 36 extends upwardly from the lower chain vise and attaches to one end of wrenching cylinder 35. A downwardly extending boss 37 connects upper chain vise 30 to wrenching cylinder 35. The bosses 36 and 37 are structurally mounted to transmit the load to each of the chain vises. To apply the final make-up, wrenching cylinder 35 is retracted which causes chain 32 and upper conductor casing 21 to rotate clockwise relative to lower chain vise 20 and lower casing conductor joint 2. The rotation of chain 32 relative to lower chain vise 20 applies the necessary torque across the threaded connection to reach the final make-up torque and position. In one embodiment, the conductor torquing apparatus may be used to apply a final make-up torque ranging from the initial make-up torque to about a 120,000 foot pounds. However, it should be understood that the final make-up torque may vary depending upon the size, type and make of the threaded connector.

In a preferred embodiment, the conductor torquing apparatus is hydraulically operated. More particularly, chain tensioner cylinders 60, arm drive cylinder 65, wrenching cylinder 35 and spinning means drive gear units 70 are hydraulically actuated. However, one of skill in the art will appreciate that the apparatus could also be electromechanically or pneumatically actuated. The apparatus may be operated by a remote control console, thereby reducing the number of personnel on the rig floor. In a preferred embodiment, a hydraulically actuated remote control unit is connected to apparatus 10 and powered by any suitable commercial hydraulic power unit. It is contemplated that a single operator could operate the conductor torquing apparatus from the remote control unit located a sufficient distance away from the tubular make-up area thereby reducing the potential for injury to the operator. In addition to being substantially safer than conventional methods and apparatus for making-up and running (or breaking out and retrieving) large diameter conductor casing, the present invention also is a more cost effective and efficient way of making-up and running (or breaking-out and retrieving) such conductor casing.

The present invention also includes the methods of making-up threaded tubulars using the previously described embodiments of the torquing apparatus. According to a preferred method, a first joint of conductor casing is run into the wellbore and landed in the rotary table. A new joint of conductor casing is picked up and moved in from the rig's V-door. The second joint is positioned above and stabbed into the box member of the joint of conductor casing suspended in the rotary table by using the rig's air tuggers or by using an automated system. The conductor torquing apparatus 10 is moved horizontally into engagement with the two joints of conductor casing, preferably by use of the hydraulic arm of the BJ Tubular Services' Leadhand II system. The lower chain vise 20 is closed about the lower casing conductor joint extending from the rotary table. Lower chain tensioner cylinder 60 is actuated (i.e., retracted) to tension chain 22 thereby locking the lower chain vise to conductor casing 2. Die blocks 31 may be included in support plate 26 to provide an additional gripping force on conductor casing 2 to keep the casing from rotating during make-up of threaded connector 3. Arms 50 are moved about the upper joint of conductor casing, telescoping the arms outwardly if necessary as shown in FIG. 2. Arms 50 are closed about the conductor casing and retracted until the upper joint of conductor casing is pressed firmly against drive wheels 68. The drive wheels are rotated by drive unit 70 to rapidly rotate the upper joint of conductor casing at a low torque to make-up threaded connector 3 to an initial make-up position. Arms 50 apply sufficient horizontal force to ensure that the drive rollers are fully engaged on the upper joint of conductor casing, and thereby have enough frictional force to rotate the joint.

Once the initial make-up torque is applied, the upper chain vise is actuated to grip casing conductor 1 by applying tension to chain 32 by upper chain tensioner cylinder 60. Thereafter, wrenching cylinder 35 is actuated (i.e., retracted) to apply rotational force to the upper chain vise thereby causing the upper joint to rotate the final make-up distance (e.g., about 1–3 radial inches) until the final make-up torque is applied to connector 3.

To release the conductor torquing apparatus, the tension is released from chain 32 by extending the upper chain tensioner cylinder 60. Drive cylinder 65 is contracted thereby causing arms 50 to pivot about pivot pins 58 and move to the open position as shown in FIG. 2. Lower chain tensioner cylinders 60 is also extended to relieve the tension on chain 22, after which chains 32 and 22 may be unlocked and apparatus 10 can be pulled back away from the conductor casing.

Although the above description has been directed to the make-up of a threaded conductor casing connection, one of skill will appreciate that conductor torquing apparatus 10 can be used to break-out a connection by reversing the operation of the tool. More particularly, wrenching cylinder 35 may be actuated (i.e. extended) to cause upper chain vise 30 to apply a counterclockwise rotation to the upper conductor casing joint to break-out the connection. Drive wheels 68 may be rotated in the opposite direction to unscrew the pin member on upper connector casing joint 1 from the box member of lower conductor casing joint 2.

Figure 6:
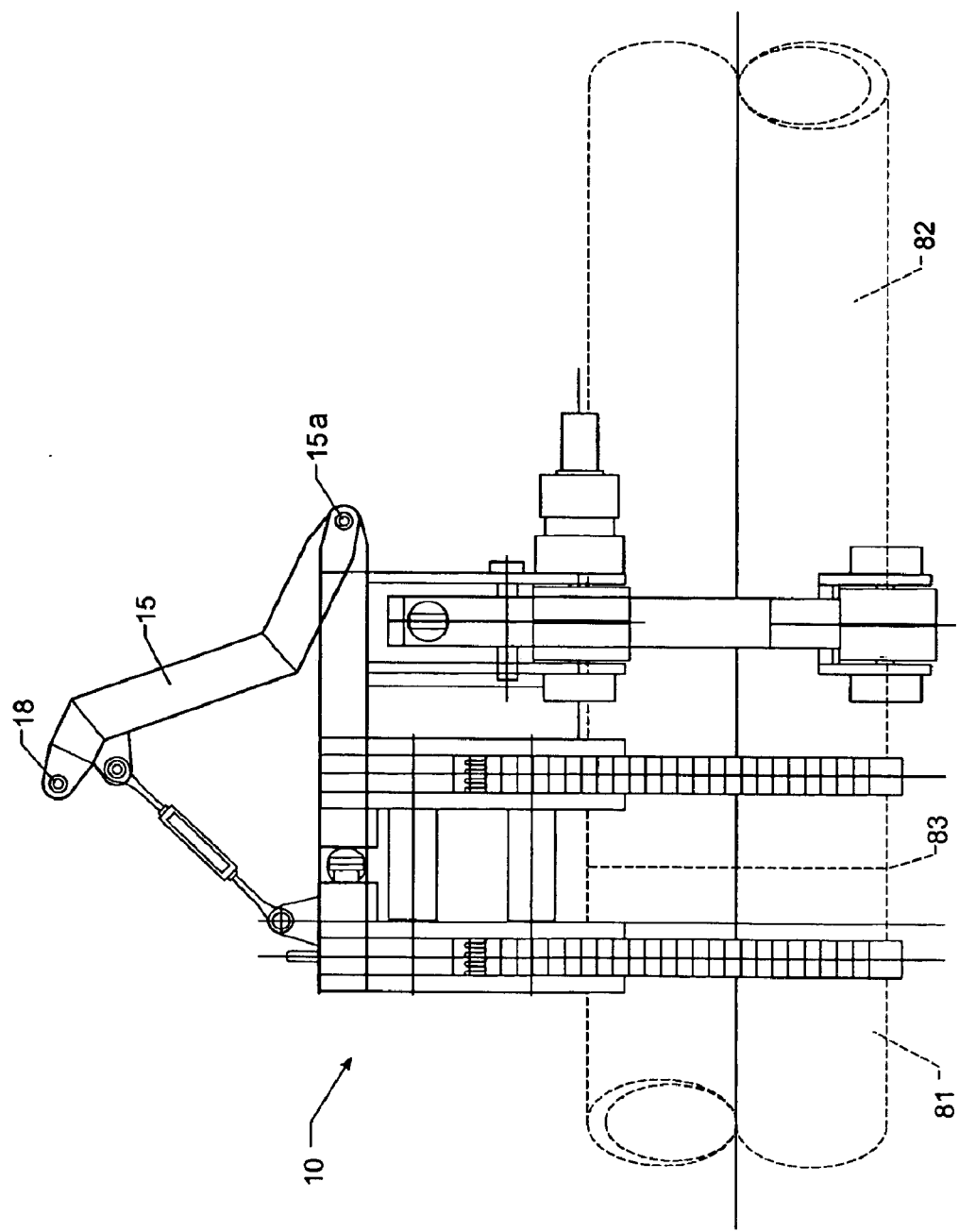
FIG. 6 is a side view of an embodiment of the invention in horizontal operation on a large diameter threaded tubular.

The torquing apparatus could also be used in making up or breaking out horizontal pipe, such as laying pipelines which have threaded connectors. FIG. 6 illustrates apparatus 10 rigged for use for horizontal operation. Frame 15 is folded at joint 15a and secured by any suitable means as shown in FIG. 6 so that torquing apparatus 10 can make-up threaded connector 83 for joints 81 and 82 in essentially the same manner as described for making-up conductor casing.

While the apparatus, compositions and methods of this invention have been described in terms of preferred or illustrative embodiments, it will be apparent to those of skill in the art that variations may be applied to the process described herein without departing from the concept and scope of the invention. For example, in another embodiment of the invention, drive wheels could be positioned on the distal end of arms 50, in place of retaining wheels 55. A separate drive unit would be associated with each drive wheel. All such similar substitutes and modifications apparent to those skilled in the art are deemed to be within the scope and concept of the invention as it is set out in the following claims.

What is claimed is:

1. An apparatus for making up large diameter conductor casing having threaded connections comprising:
    a lower chain vise adapted to grip a first joint of conductor casing to prevent rotation thereof,
    a plurality of extendable arms operable to apply a retaining force to a second joint of conductor casing to maintain the second joint of conductor casing in rotational contact with one or more drive wheels on a spinner means,
    the spinner means operable to rotationally make-up a threaded connection connecting the second joint of conductor casing to the first joint of conductor casing to an initial make-up torque, and
    an upper chain vise adapted to grip the second joint of conductor casing and operable to apply a final make-up torque to the threaded connection connecting the second joint of conductor casing to the first joint of conductor casing.

2. An apparatus for making up large diameter conductor casing having threaded connections comprising:
    a lower chain vise adapted to grin a first joint of conductor casing to prevent rotation thereof,
    a plurality of movable arms operable to apply a retaining force to a second joint of conductor casing to maintain the second joint of conductor casing in rotational contact with one or more drive wheels on a spinner means,
    the spinner means operable to rotationally make-up a threaded connection connecting the second joint of conductor casing to the first joint of conductor casing to an initial make-up torque, and
    an upper chain vise adapted to grip the second joint of conductor casing and operable to apply a final make-up torque to the threaded connection connecting the second joint of conductor casing to the first joint of conductor casing;
    wherein the lengths of the movable arms may be telescopically extended to close about the second joint of conductor casing.

3. The apparatus of claim 2 wherein the upper chain vise includes a pair of chains latchable together to grip the second joint of conductor casing.

4. The apparatus of claim 3 wherein the end of one of the chains is attached to a chain tensioner cylinder, operable to tension the chains.

5. The apparatus of claim 4 wherein the end of the other chain is attached to an anchor means.

6. The apparatus of claim 2 wherein the lower chain vise includes a pair of chains latchable together to grip the first joint of conductor casing.

7. The apparatus of claim 6 wherein the end of one of the chains is attached to a chain tensioner cylinder, operable to tension the chains.

8. The apparatus of claim 7 wherein the end of the other chain is attached to an anchor means.

9. The apparatus of claim 2 further comprising a retaining roller attached to the distal end of each retaining arm.

10. The apparatus of claim 2 wherein the upper and lower chain vises are adapted to grip conductor casing ranging from 16 inches to 48 inches in diameter.

11. The apparatus of claim 2 further comprising a chain tensioner cylinder for both the upper and lower chain vises.

12. The apparatus of claim 2 further comprising a drive cylinder for moving the movable arms.

13. The apparatus of claim 2 further comprising a remote control console for operating the movable arms and spinners.

14. The apparatus of claim 13 wherein the remote control console is hydraulically actuated.

15. The apparatus of claim 2 further comprising a wrenching cylinder connecting the upper and lower chain vises wherein operation of the wrenching cylinder transmits the final make-up torque to the upper chain vise.

16. The apparatus of claim 2 wherein the drive wheels are hydraulically actuated.

17. The apparatus of claim 11, wherein the chain tensioner cylinders are hydraulically actuated.

18. The apparatus of claim 12 wherein the drive cylinder for the retaining aims is hydraulically actuated.

19. The apparatus of claim 15 wherein the wrenching cylinder is hydraulically actuated.

20. The apparatus of claim 2 further comprising a support frame for supporting the upper and lower chain vises, the movable arms and the spinner means.

21. The apparatus of claim 2 wherein the initial make-up torque ranges from stab-in to either shoulder engagement or achievement of taper thread interference.

22. The apparatus of claim 15 wherein the final make-up torque ranges from the initial make-up torque value to about 120,000 foot pounds.

23. The apparatus of claim 2 wherein the upper chain vise further comprises one or more die blocks for gripping the second joint of casing.

24. The apparatus of claim 2 wherein the lower chain vise further comprises one or more die blocks for gripping the first joint of casing.

25. The apparatus of claim 3 further comprising pivotable support arms for supporting the pair of chains, wherein the support arms are movable between a first position where the chains may be latched together and a second position wherein the chains are released from the second joint of conductor casing.

26. The apparatus of claim 6 further comprising pivotable support arms for supporting the pair of chains, wherein the support arms are movable between a first position where the chains may be latched together and a second position wherein the chains are released from the first joint of conductor casing.

27. An apparatus for making up jointed pipe with threaded connections comprising:
 a first chain vise adapted to grip a first joint of pipe to prevent rotation thereof,
 a spinner means having one or more drive wheels operable to rotationally make-up a threaded connection between a second joint of pipe and the first joint of pipe to an initial make-up torque,
 one or more extendable arms operable to apply a retaining force to the second joint of pipe to maintain the second joint of pipe in rotational contact with the drive wheels of the spinner means, and
 a second chain vise adapted to grip the second joint of pipe and operable to apply a final make-up torque to the threaded connection.

28. An apparatus for making up jointed pipe with threaded connections comprising:
 a first chain vise adapted to grip a first joint of pipe to prevent rotation thereof,
 a spinner means having one or more drive wheels operable to rotationally make-up a threaded connection between a second joint of pipe and the first joint of pipe to an initial make-up torque,
 one or more movable arms operable to apply a retaining force to the second joint of pipe to maintain the second joint of pipe in rotational contact with the drive wheels of the spinner means, and
 a second chain vise adapted to arm the second joint of pipe and operable to apply a final make-up torque to the threaded connection;
 wherein the lengths of the movable arms may be telescopically extended to close about the second joint of pipe.

29. The apparatus of claim 28 wherein the lower chain vise further incorporates one or more die blocks for gripping the first joint of pipe.

30. The apparatus of claim 28 wherein the upper chain vise includes a pair of chains latchable together to grip the second joint of pipe.

31. The apparatus of claim 30 wherein the end of one of the chains is attached to a chain tensioner cylinder, operable to tension the chains.

32. The apparatus of claim 31 wherein the end of the other chain is attached to an anchor means.

33. The apparatus of claim 28 wherein the lower chain vise includes a pair of chains latchable together to grip the first joint of pipe.

34. The apparatus of claim 33 wherein the end of one of the chains is attached to a chain tensioner cylinder, operable to tension the chains.

35. The apparatus of claim 34 wherein the end of the other chain is attached to an anchor means.

36. The apparatus of claim 28 further comprising a wrenching cylinder connecting the upper and lower chain vises wherein operation of the wrenching cylinder transmits the final make-up torque to the upper chain vise.

37. The apparatus of claim 28 further comprising a support frame for supporting the upper and lower chain vises and the spinner means.

38. The apparatus of claim 28 wherein the upper chain vise further comprises one or more die blocks for gripping the second joint of pipe.

39. The apparatus of claim 28 further comprising pivotable support anus for supporting the pair of chains, wherein the support arms are movable between a first position where the chains may be latched together and a second position wherein the chains are released from the second joint of pipe.

40. The apparatus of claim 31 further comprising pivotable support arms for supporting the pair of chains, wherein the support arms are movable between a first position where the chains may be latched together and a second position wherein the chains are released from the first joint of pipe.

41. A method for making up large diameter conductor casing having threaded connections comprising:
 gripping a first joint of conductor casing with a lower chain vise to prevent rotation thereof,
 applying a retaining force to a second joint of conductor casing with one or more arms to maintain the second joint of conductor casing in rotational contact with one or more drive wheels on a spinner means, wherein the lengths of the arms may be telescopically extended to close about the second joint of pipe, making-up a threaded connection connecting the second joint of conductor casing to the first joint of conductor casing to an initial make-up torque with the spinner means, and applying a final make-up torque to the threaded connection connecting the second joint of conductor casing to the first joint of conductor casing with an upper chain vise, wherein the lower chain vise, the upper chain vise, the one or more arms and spinner means are components of a single apparatus.

42. The method of claim 41 wherein the step of applying a final make-up torque further comprises actuating a wrenching cylinder connected to the upper and lower chain vises to transmit the final make-up torque to the upper chain vise.

43. The method of claim 42 further comprising hydraulically actuating the wrenching cylinder.

44. The method of claims 41 wherein the step of gripping a first joint of conductor casing further comprises hydraulically actuating a chain tensioner cylinder to tension the lower chain vise.

45. The method of claim 41 further comprising tensioning the upper chain vise to grip the second joint of conductor casing by hydraulically actuating a chain tensioner cylinder.

46. The method of claim 41 further comprising hydraulically actuating the one or more drive wheels on the spinner means to make up the threaded connection to the initial make-up torque.

47. A method for making up jointed pipe having threaded connections comprising:

gripping a first joint of pipe with a lower chain vise to prevent rotation thereof, applying a retaining force to a second joint of pipe with one or more arms to maintain the second joint of pipe in contact with one or more drive wheels on a spinner means, wherein the lengths of the arms may be telescopically extended to close about the second joint of pipe, making up a threaded connection connecting the second joint of pipe to the first joint of pipe to an initial make-up torque with the spinner means, and applying a final make-up torque to the threaded connection connecting the second joint of pipe to the first joint of pipe with an upper chain vise, wherein the lower chain vise, the upper chain vise, the one or more arms and spinner means are components of a single apparatus.

* * * * *

UNITED STATES PATENT AND TRADEMARK OFFICE
CERTIFICATE OF CORRECTION

PATENT NO. : 7,076,852 B2  Page 1 of 1
APPLICATION NO. : 10/367210
DATED : July 18, 2006
INVENTOR(S) : Penman et al.

It is certified that error appears in the above-identified patent and that said Letters Patent is hereby corrected as shown below:

Claim 2, Column 8, line 30, delete "grin" and insert --grip--.

Claim 28, Column 10, line 11, delete "arm" and insert --grip--.

Claim 39, Column 10, line 47, delete "anus" and insert --arms--.

Claim 44, Column 11, line 18, delete "claims" and insert --claim--.

Signed and Sealed this

Seventh Day of November, 2006

JON W. DUDAS
*Director of the United States Patent and Trademark Office*